Nov. 25, 1930.    J. E. SPILMAN    1,783,144
ANIMAL TRAP
Filed Jan. 2, 1930
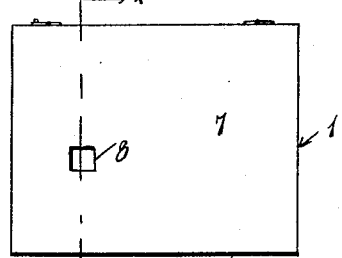
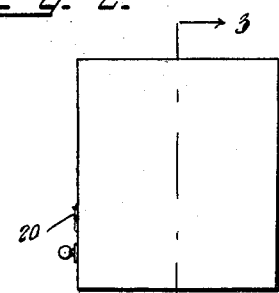
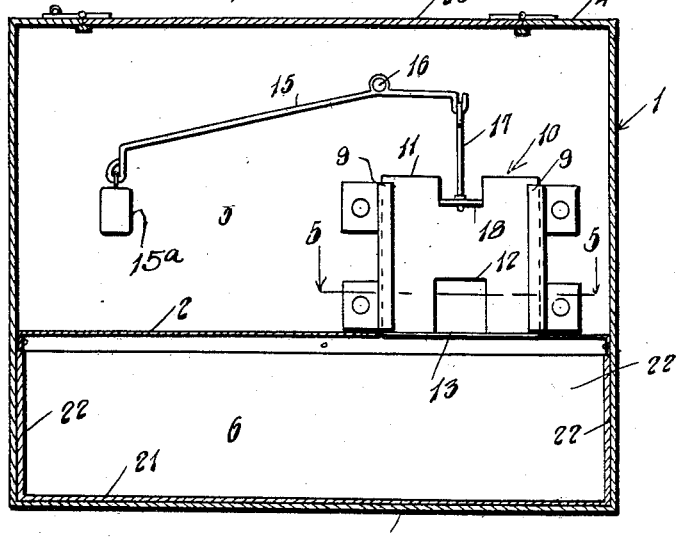
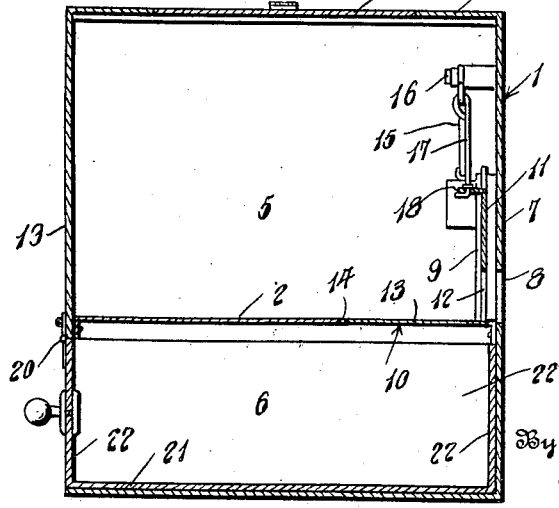
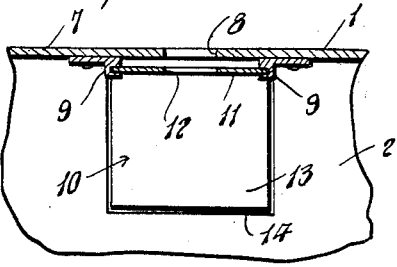
Inventor
J. E. Spilman,
By
Attorney Patented Nov. 25, 1930

1,783,144

UNITED STATES PATENT OFFICE

JAMES E. SPILMAN, OF WARTRACE, TENNESSEE

ANIMAL TRAP

Application filed January 2, 1930. Serial No. 418,045.

The invention relates to traps for catching rodents and the like and has for its object the provision of a trap of the self-setting type and employing a vertically movable trip member including a platform over which the animal enters the trap and that is counterweighted to normally hold it in position to from an entrance to the trap, said trip member being moved downwardly by the weight of the animal to deposit the animal in a captive chamber in the lower portion of the trap.

Further objects of the invention will be apparent from the detail description of the invention and from the drawings in which Figure 1 is a front view of the improved animal trap, Figure 2, a side view, Figure 3, a sectional view on an enlarged scale on a plane indicated by the line 3—3 of Figure 2, Figure 4, a similar view on a plane indicated by the line 4—4 of Figure 1, and Figure 5, a sectional detail on the plane indicated by the line 5—5 of Figure 3.

In the drawings similar reference characters are used to designate corresponding parts in all of the views.

As illustrated in the drawings the trap comprises a housing 1 having a horizontal partition 2 arranged intermediate of its bottom 3 and top 4 that divides the interior of the housing 1 into an upper or entrance chamber 5 and a captive chamber 6. One of the side walls 7 of the housing 1 is provided with a door opening 8 through which the victim enters the trap, and the entrance 8 may be approached by means of a runway (not shown) or by any other suitable means. Arranged on opposite sides of the entrance opening 8 are grooved slide bearings 9 and slidably mounted in said bearings is a trip member 10 consisting of a vertical plate 11 having an opening 12 therein that alines with the opening 8 in normal position, and a platform 13 that is arranged within an opening 14 in the horizontal partition 2 when in normal position. 15 indicates a lever pivotally mounted as shown at 16 on the wall 7 and having one end connected by means of a link 17 with a laterally projecting flange 18 on the vertical member 11, while its other end is provided with a counterweight 15ª that normally holds the trip member 10 in the position shown in the drawings, the lower ends of the slide bearings 9 providing stops to limit the upward movement of the trip member 10. Another of the walls of the housing 1, indicated at 19, is provided with an opening 20 through which is slidably mounted a container having a bottom 21 and upright walls 22 to receive and hold victims in the captive chamber 6, said container being removable through the opening 20 to empty the trap. The top 4 of the trap is also provided with a closure 23 affording access to the interior of the entrance chamber 5 for baiting the trap or for any other purposes.

In operation, bait may be strewn on the partition 2 forming the floor of the entrance chamber 5 to attract the victims and as they enter the trap through the opening 8 onto the platform 10 the weight of the animal lowers the platform against the counterweight 15ª and the animal in endeavoring to escape is entrapped in the captive chamber 6 from whence it may be removed by removal of the container therein through the opening 20.

What is claimed is:—

1. In an animal trap, a housing having an entrance opening in one of its walls, a horizontal partition in said housing dividing it into an entrance chamber and a captive chamber, said partition provided with an opening contiguous to the entrance opening, a trip member having an upright portion slidably mounted over said entrance opening and having an opening alined with said entrance opening, and a horizontal platform movable through the opening in the partition, and means to hold said trip member elevated with the platform alined with the partition, said upright portion providing a closure for the entrance opening when the platform is depressed by a victim.

2. In an animal trap, a housing having an entrance opening in one of its walls, a horizontal partition in said housing dividing it into an entrance chamber and a captive chamber and having an opening therein contiguous to the entrance opening, slide bearings on said walls on opposite sides of said entrance opening, an angular trip member slidably mounted in said bearings and including an upright plate having an opening therein alined with said entrance opening in one position of the member and closing said entrance opening in another position, a horizontal platform on said trip member movable through the opening in the partition and normally alined therewith and means to hold said trip member in normal position with the entrance opening unobstructed and the platform raised and on the same plane with the partition.

3. In an animal trap, a housing, a horizontal partition in said housing dividing its interior into an entrance chamber and a captive chamber, a trip mechanism communicating through said partition and having a platform normally alined with the partition, a vertically slidable member on said trip mechanism and having an opening therein, the housing provided with an entrance opening normally alined with the first mentioned opening, said vertically slidable member providing a closure for the last mentioned opening when it is moved to a lowered position by the weight of a victim, and gravity actuated means to hold the trip mechanism in elevated position with the openings alined.

In testimony whereof I affix my signature.

JAMES E. SPILMAN.